United States Patent [19]

Emig et al.

[11] 4,014,840
[45] Mar. 29, 1977

[54] NON-DISTRESSING ACCELERATED HEAT CURE OF PORTLAND CEMENT CONCRETE SYSTEMS

[75] Inventors: Gale L. Emig, Midland; Robert H. Anspaugh, Bay City; R. Douglas Eash, Midland, all of Mich.

[73] Assignee: The Dow Chemical Company, Midland, Mich.

[22] Filed: June 12, 1974

[21] Appl. No.: 478,480

[52] U.S. Cl. .................. 260/29.6 S; 260/42.13
[51] Int. Cl.² .................................. C08L 27/08
[58] Field of Search ........... 260/29.6 S, 29.7 S, 260/42.13

[56] References Cited

UNITED STATES PATENTS

| | | | |
|---|---|---|---|
| 2,819,239 | 1/1958 | Eberhard | 260/29.6 S |
| 3,250,736 | 5/1966 | Gibbs | 260/29.6 S |
| 3,297,613 | 1/1967 | Gibbs | 260/29.6 S |
| 3,325,435 | 6/1967 | Gibbs | 260/29.6 S |
| 3,773,700 | 11/1973 | Eash | 260/29.6 S |
| 3,784,648 | 1/1974 | Bergmeister | 260/29.6 S |
| 3,819,565 | 6/1974 | Yasima | 260/29.6 S |
| 3,879,909 | 4/1975 | Lamoria | 260/29.6 S |

*Primary Examiner*—Paul R. Michl
*Attorney, Agent, or Firm*—Ronald G. Brookens

[57] ABSTRACT

A process for accomplishing a non-distressing accelerated heat cure of portland cement concrete systems comprising (1) admixing portland cement concrete with minor amounts of a vinylidene chloride polymer latex, than (2) heating the admixture to temperatures of from at least about 100° F to about 250° F under less than about 80 percent relative humidity for a period of at least about 4 hours. This process is particularly applicable for the preparation of portland cement concrete precasting and prestressing operations, where optimum strength is desired in the shortest possible time.

2 Claims, 2 Drawing Figures

NON-DISTRESSING ACCELERATED HEAT CURE OF PORTLAND CEMENT CONCRETE SYSTEMS

BACKGROUND OF THE INVENTION

Efficient operation of concrete precasting and prestressing manufacturing plants requires that the molds be reused as quickly as possible. In this regard, steam curing of the portland cement concrete systems is generally used as it has been found that accelerated curing of non-latex modified compositions with dry heat results in significant cracking which makes such materials structurally useless (see FIG. 1).

During the steam curing operation the concrete mix is left to "dwell" without heat, for a period of from about 2 to 5 hours. Heat is then applied and a temperature rise of 30° F to 50° F per hour is used. Such curing method requires at least from about 12 to 18 hours cure time and even with such elaborate precautions the concrete mixes never attain the strengths which are obtained by use of unaccelerated cures. Further, in the case of latex-modified cement products, the use of steam has been found to be detrimental to obtainment of optimum strength in such products.

The effect of temperature during cure of conventional non-latex modified portland cement concrete systems is illustrated on page 84 of the January, 1963, issue of *The Journal of American Concrete Institute* and pages 517-3 thru 517-9 of the *ACI Manual of Concrete Practice*, Part 3, 1968. The data set forth by the referred to publications clearly show that utilization of a temperature greater than about 70° F, in either a steam cure or dry cure, results in a weakening of the concrete mix (based on a standard 28 day normal cure strength).

It is the primary object of the present invention to provide a means of achieving a non-distressing accelerated cure of precast or prestressed portland cement concrete systems to obtain optimum strength in the shortest possible time.

SUMMARY OF THE INVENTION

The above and related objects are obtained by providing a non-distressing accelerated heat cure of portland cement concrete systems by (1) admixing portland cement concrete with a vinylidene chloride polymer latex, with such latex being present in an amount sufficient to provide from 5 to 20 percent by weight of latex solids based on the weight of portland cement then (2) heating the admixture to temperatures of from at least about 100° F to 250° F under less than about 80 percent relative humidity until the desired amount of cure is obtained.

It has been found that such process provides portland cement concrete compositions which are unexpectedly free from microcracks as contrasted to non-latex modified cement concrete compositions cured in the same manner (as illustrated in FIG. 1 and FIG. 2).

Further, the use of the accelerated curing process of the present invention provides precast or prestressed structures of increased relative humidity with accompanying higher initial and ultimate strength. Utilization of this process also significantly increases production capacity of such structures by elimination of the requirement of excessive "dwell" time and the presence of steam generating equipment.

It is believed that the above advantages are attributable at least in part, to improved physical and mechanical properties imparted to the portland cement concrete by the presence of the vinylidene chloride polymer latex. Thus, the cement systems are able to resist damage, e.g., the formation of microcracks, inherent in cement systems unmodified with such latex during the accelerated cure process. Further, the internal relative humidity of the concrete system is retained at high levels due to the presence of the latex which permits additional hydration of the cement system with accompanying gain in initial and ultimate strength.

DESCRIPTION OF PREFERRED EMBODIMENTS

Figure 1:

By the term "vinylidene chloride polymer latex" as used herein is meant any aqueous colloidal dispersion of an organic interpolymer composed of from about 35 to about 90 parts by weight of vinylidene chloride and from about 65 to about 10 parts by weight of at least one other interpolymerized material of the general formula:

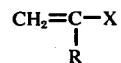

wherein "R" is selected from the group consisting of hydrogen and the methyl group and X is selected from the group consisting of -CN, halogens of atomic numbers 9 to 35, and ester-forming groups, -COOY, wherein Y is selected from the group consisting of a primary alkyl group and a secondary alkyl group, each of the foregoing alkyl groups containing from 1 to 18 carbon atoms inclusively.

Exemplary of such interpolymerizable monomeric materials are: methyl acrylate, ethyl acrylate, propyl acrylate, isopropyl acrylate, butyl acrylate, isobutyl acrylate, sec.-butyl acrylate, tert.-butyl acrylate, amyl acrylate, isoamyl acrylate, tert.-amyl acrylate, hexyl acrylate, 2-ethylhexyl acrylate, cyclohexyl acrylate, octyl acrylate, 3,5,5-trimethylhexyl acrylate, decyl acrylate, dodecyl acrylate, octadecenyl acrylate, methyl methacrylate, ethyl methacrylate, 2-ethylbutyl methacrylate, octyl methacrylate, phenyl methacrylate, cyclohexyl methacrylate, 3,5,5-trimethylhexyl methacrylate, decyl methacrylate, dodecyl methacrylate, and octadecyl methacrylate and butoxyethyl acrylate or methacrylate or other alkoxyethyl acrylates or methacrylates, vinyl halides (e.g., vinyl chloride, vinyl bromide, etc.), acrylonitrile, methacrylonitrile, and the like.

Representative types of water-insoluble vinylidene chloride-containing interpolymers which have been discovered to be highly satisfactory for use as the latex components employed in the superior latex-modified portland cement mortar compositions of the present invention include the following interpolymers designated in the following Table I:

TABLE I

| Organic Monomer Components | Vinylidene Chloride Interpolymer Compositions Parts by Weight | | | | | | | | | | | |
|---|---|---|---|---|---|---|---|---|---|---|---|---|
| Vinylidene Chloride | 40 | 60 | 89 | 90 | 50 | 88 | 50 | 52 | 70 | 75 | 75 | 75 |
| Vinyl Chloride | | | | | | | 40 | 35 | 20 | 20 | 20 | 20 |

TABLE I-continued

Vinylidene Chloride Interpolymer Compositions

| Organic Monomer Components | Parts by Weight | | | | | | | | | | |
|---|---|---|---|---|---|---|---|---|---|---|---|
| Ethyl Acrylate | 60 | 40 |  | 40 | 7 | 10 |  | 10 | 5 |  | 5 |
| Methyl Methacrylate |  |  | 10 | 10 |  |  |  |  |  |  | 2 |
| 2-Ethylhexyl Acrylate |  |  |  |  |  |  | 13 |  |  |  |  |
| Acrylonitrile |  |  | 11 |  | 5 |  |  |  |  | 5 |  |

Of particular benefit in the preparation of the exceptionally strong, latex-modified portland cement concrete compositions of the present invention is the interpolymer latex containing about 75 parts by weight of interpolymerized vinylidene chloride, about 20 parts by weight of interpolymerized vinyl chloride, about 5 parts by weight of interpolymerized ethyl acrylate, and about 2 parts by weight of interpolymerized methyl methacrylate.

The cement referred to may be selected from the group of inorganic settable materials, such as hydraulic, portland, natural, or aluminous cement.

The mineral aggregate used may be stone, gravel, pebbles, granite, carborundum, aluminum oxide, emery, marble chips, sawdust, cinders or other aggregate commonly employed in cement concrete. The intended end use of the cement system can undoubtedly serve as a guide to those skilled in the art as to the choice of preferred particle size of the aggregate material to be used.

It is to be understood that the method of the present invention is applicable to any conventionally used portland cement concrete system.

It has further been discovered, which discovery is a part of the present invention, that the portland cement concrete systems described herein can be cured immediately upon addition of the polymeric latex modifier and that controlling of the rate of temperature increase is unnecessary. Further, the temperatures used and the duration of exposure to such temperature will depend somewhat upon the cement system employed. In any event, exposure to dry heat at temperatures in the range of from at least about 100° F to 250° F, for a period of at least about 4 hours is generally required. For longer cure times, preferred temperatures are generally in the range of from about 200° F to 210° F.

The following specific examples further illustrate the present invention.

EXAMPLE 1

The following general formulations were used to prepare a series of individual portland cement concrete systems. In those formulations containing a polymeric latex, such latex contained about 50 percent by weight of interpolymer solids having the following composition:

75 pts. by wt. vinylidene chloride
20 pts. by wt. vinyl chloride
5 pts. by wt. ethyl acrylate
2 pts. by wt. methyl methacrylate Mix A — Non-latex Modified — Regular Density

| Material | Parts by Weight |
|---|---|
| Huron Type III Cement | 7.14 |
| Water | 3.36 |
| Pea Gravel | 10 |
| 2 NS Sand | 15 |
| Silicone Antifoamer | 0.013 |

Mix B — Latex Modified — Regular Density

| Material | Parts by Weight |
|---|---|
| Huron Type III Cement | 7.14 |
| Water | 1.38 |
| Pea Gravel | 10 |
| 2 NS Sand | 15 |
| Interpolymer Latex | 2.32 |

Mix C — Non-latex Modified — Lightweight

| Material | Parts by Weight |
|---|---|
| Huron Type I Portland Cement | 336 |
| Water | 174 |
| 2 NS Sand | 652 |
| Lightweight Aggregate | 700 |
| Water Reducing Admix | 1.5 |
| Air Entraining Agent | 0.1 |

Mix D — Latex Modified — Lightweight

| Material | Parts by Weight |
|---|---|
| Huron Type I Portland Cement | 336 |
| Water | 172 |
| 2 NS Sand | 652 |
| Lightweight Aggregate | 700 |
| Interpolymeric Latex | 70 |

In each instance, the sand and portland cement were first thoroughly mixed and the interpolymer latex added thereto. The entire formulation was then mixed in a conventional paddle-type mixer until an even consistency was obtained (about 4 to 5 minutes). Individual 4 inch diameter × 8 inch high compression cylinders were prepared from each of the above mixes and the cubes cured and tested for compressive strength. The following Table II sets forth the conditions employed and the results obtained.

TABLE II

|  | MIX-A (For Comparison) Exp. No. 1 | MIX-B (The Invention) Exp. No. 2 | MIX-C (For Comparison) Exp. No. 3 | MIX-D (The Invention) Exp. No. 4 |
|---|---|---|---|---|
| % Latex Solids (Based on weight of cement) | 0 | 15 | 0 | 10 |
| Dwell Time (hours) | 7 | 7 | 0 | 0 |
| Cure Time (hours) | 8 | 4 | 4 | 4 |

TABLE II-continued

|  | MIX-A (For Comparison) Exp. No. 1 | MIX-B (The Invention) Exp. No. 2 | MIX-C (For Comparison) Exp. No. 3 | MIX-D (The Invention) Exp. No. 4 |
|---|---|---|---|---|
| Cure Temperature (° F) | 250 | 250 | 200 | 200 |
| Relative Humidity |  |  |  |  |
| (A) (%) Immediately After Cure | 78 | 91 | — | — |
| (B) (%) 200 Days After Cure | 50 | 58 | — | — |
| Compressive Strength-PSI (ASTM C-39) |  |  |  |  |
| (A) Immediately After Cure | 4,980 | 6,000 | 580 | 1,218 |
| (B) 200 Days After Cure | 5,070 | 9,030 | — | — |

Figure 2:
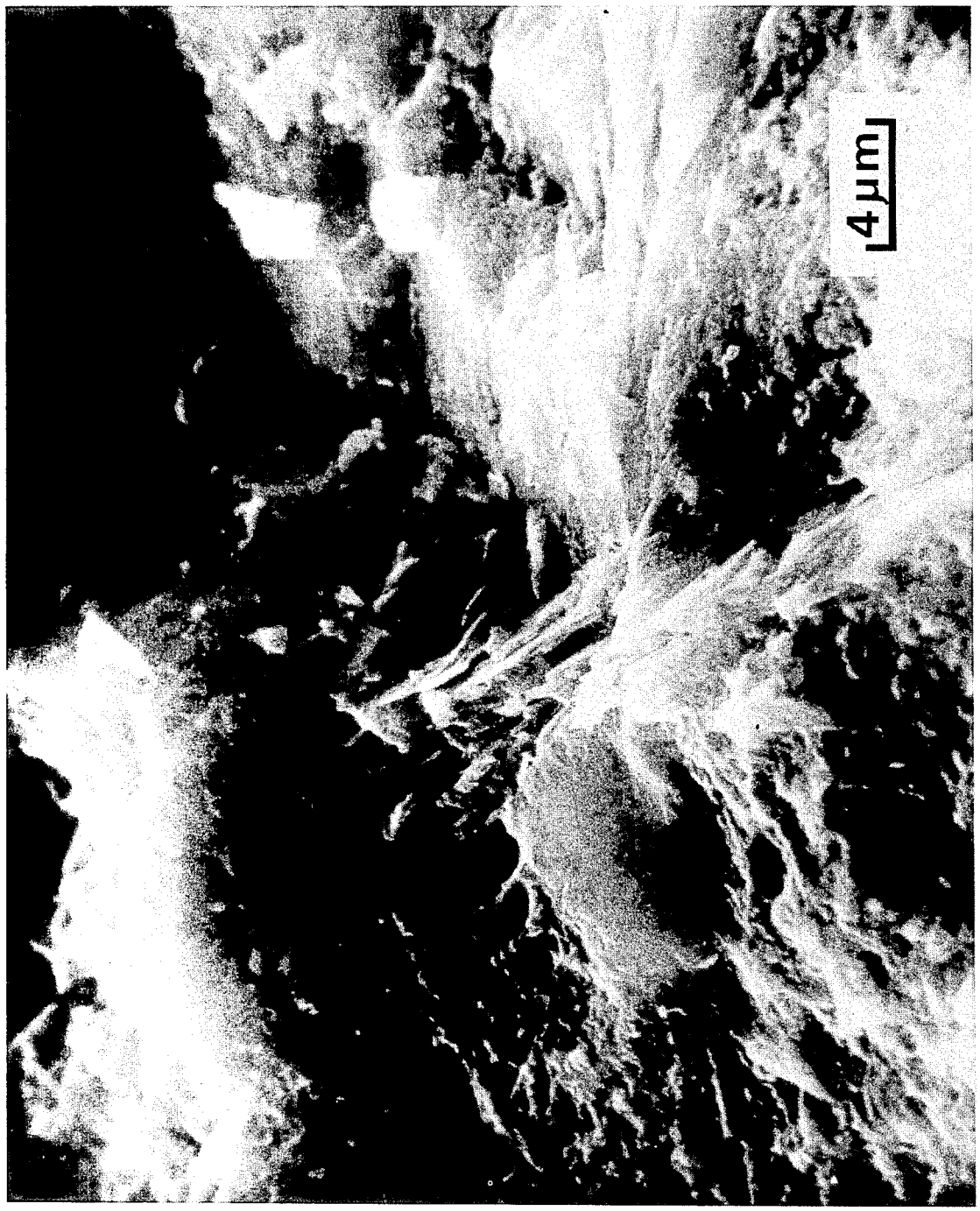

The above data illustrate the significantly improved initial and ultimate compressive strength obtained in portland cement concrete systems, accelerated by utilization of the curing method as prescribed by the present invention. In the accompanying drawings, FIG. 1 is an electron micrograph of the non-latex modified composition identified in Table II as Exp. No. 1; FIG. 2 is an electron micrograph of the latex-modified composition identified in Table II as Exp. No. 2. A comparison of such micrographs illustrates the tendency for non-latex modified portland cement concrete to develop undesirable microcracks when subjected to accelerated dry heat cure.

What is claimed is:

1. A process for non-distressing accelerated heat cure of portland cement concrete systems said process consisting of the sequential steps of (1) admixing portland cement concrete with a vinylidene chloride polymer latex said latex being present in an amount sufficient to provide from about 5 to about 20 percent by weight of latex solids based on the weight of portland cement in said portland cement concrete and wherein said vinylidene chloride polymer is composed of about 75 parts by weight of vinylidene chloride, about 5 parts by weight of ethyl acrylate, about 2 parts by weight of methyl methacrylate and about 20 parts by weight of vinyl chloride, then (2) heating said admixture to temperatures of from at least about 100° F to about 250° F under less than about 80 percent relative humidity for a period of at least about 4 hours.

2. A cured, substantially crack-free portland cement concrete prepared by the process of claim 1.

* * * * *